G. WESTINGHOUSE.

Grain and Seed Winnower.

No. 1,366. Reissued Dec. 16, 1862.

Attest
J. W. Coombs
Geo. Reed

Inventor.
George Westinghouse
per Munn & Co
Attorneys.

N. PETERS, Photo-Lithographer, Washington, D. C.

UNITED STATES PATENT OFFICE.

GEORGE WESTINGHOUSE, OF SCHENECTADY, NEW YORK.

IMPROVEMENT IN GRAIN AND SEED WINNOWERS.

Specification forming part of Letters Patent No. 34,605, dated March 4, 1862; Reissue No. 1,366, dated December 16, 1862.

*To all whom it may concern:*

Be it known that I, GEORGE WESTINGHOUSE, of Schenectady, in the county of Schenectady and State of New York, have invented a new and Improved Grain and Seed Fanning or Winnowing Machine; and I do hereby declare that the following is a full, clear, and exact description of the same, reference being had to the accompanying drawings, making a part of this specification, in which—

Figure 3:
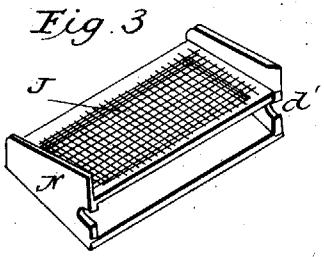
Figure 1:
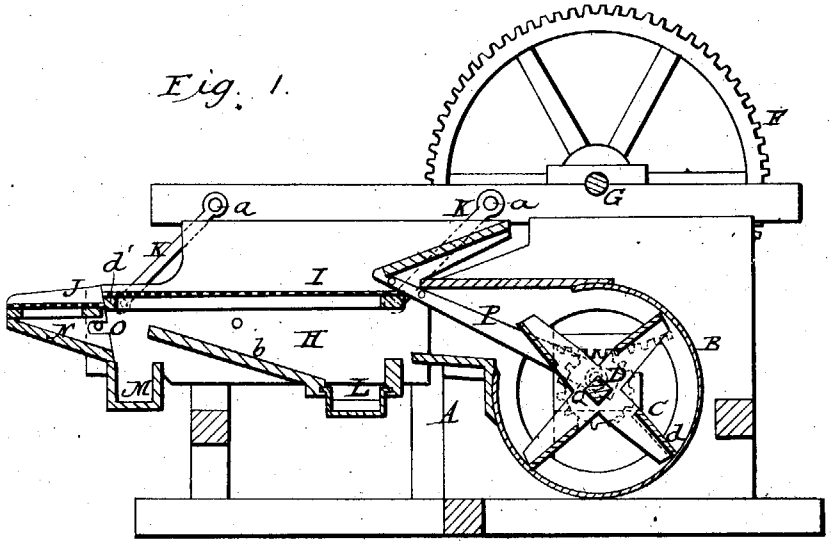
Figure 2:
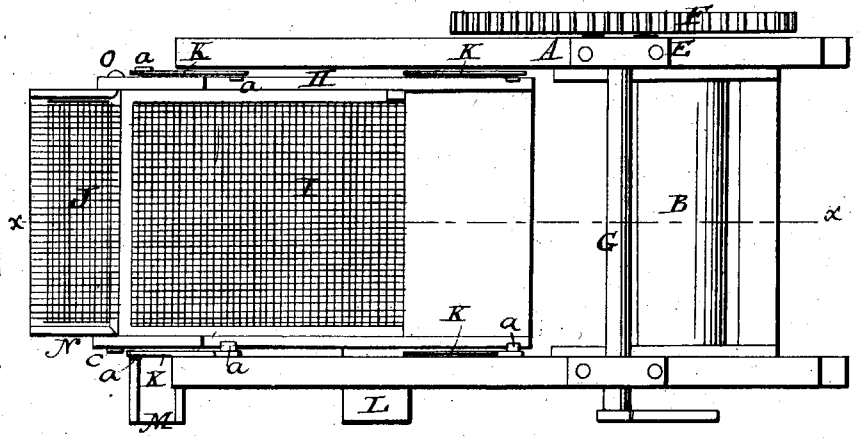

Figure 1 is a side sectional view of my invention, taken in the line *x x*, Fig. 2. Fig 2 is a plan or top view of the same. Fig. 3 is a detached perspective view of the tail-screen pertaining to the same.

Similar letters of reference indicate corresponding parts in the several figures.

To enable those skilled in the art to fully understand and construct my invention, I will proceed to describe it.

A represents the frame of the machine, which may be of rectangular form, and which is provided with a fan-box, B, at one end, in which a rotary fan, C, is placed. The shaft D of the fan C has a pinion, E, at one end of it, and into this pinion a toothed wheel, F, gears, said wheel being on a shaft, G, which is on the top of the frame A. H represents the shoe, which may be constructed in the usual way, with a main screen, I, in its upper part, and tail-screen J at its outer end, directly in line with screen I and adjoining it. The shoe H is suspended in the frame R by parallel rods K, two at each side, said rods being attached to the frame R and to the shoe H by pivots *a*. The shoe has a trough, L, placed transversely in its bottom, to discharge the sound grain at one side, and an inclined board, *b*, beneath screen I, conducts the grain which passes through the screen I to the trough. (See Fig. 1.) M is a trough, which is placep transversely at the bottom of the shoe, near its outer end. This trough receives the screenings from the tail-screen J, which is placed in an adjustable box, N, fitted in the outer end of shoe H, and secured therein by a rod, O, with a screw or nut at one end, as shown at *c*, said rod O passing through the sides of the shoe H, and through notches *d′ d′* in the sides of the screen-box N. By screwing up the nut *c*, the inner end of the box N may be clamped in the shoe H, and secured in a horizontal or in a more or less inclined position, as may be desired, so as to regulate the screening, by accelerating or checking the discharge from the end of the screen J. By this arrangement the box N may be adjusted when the shoe H is in operation.

The shoe H is operated from the fan-shaft D by means of two connecting-rods, P P, which are attached to cranks Q on the fan-shaft D. The shoe H is considerably above the fan-shaft D, and has such a relative position therewith that the cranks Q and rods P will vibrate the shoe H in an oblique direction, say at an angle of about forty-five degrees. By operating the shoe H in this direction, the straws and chaff in the grain will not catch in the screen I and pass through it, as in the case when a horizontal reciprocating motion is given it, for this reason: In the former case the shoe intermittently falls away from the grain and chaff, and the grain, being heavier than the chaff, it falls by its own gravity onto the screen, while the chaff is buoyed up or prevented from following, and is blown over the tail end of the screen by the current of air created by the fan passing over it. In the latter case the shoe has no falling movement, and the grain and chaff lying together promiscuously on the screen renders it impossible to prevent a portion of the latter from working through with the grain, unless both be subjected to a powerful blast, in which case a portion of the grain is liable to be blown away with the chaff. Besides the above advantage the former or oblique movement of the shoe does not require to be so great as the latter or horizontal movement in order to perform the necessary work.

The fan C has one of its wings or blades, *d*, made heavier than the other three, in order to counterpoise the shoe H and its screens. This heavy blade or wing is directly or nearly in line with the cranks Q, but at the opposite side of the fan-shaft D. This counterpoising of the shoe H serves to equalize its motion and insure an easy and smooth working of the machine.

I am aware that straw-carriers in thrashingmachines have been hung between swinging arms, and this I do not claim, broadly; but,

Having thus described my invention, what I claim as new, and desire to secure by Letters Patent, is—

The combination of the swinging shoe H, operating, as described, with the fan C when the blast of the latter operates upon the former, in the manner and for the purpose specified.

G. WESTINGHOUSE.

Witnesses:

JAMES H. GRIDLEY,

CHARLES SMITH.